US007085980B2

(12) United States Patent
Martin-de-Nicolas et al.

(10) Patent No.: US 7,085,980 B2
(45) Date of Patent: Aug. 1, 2006

(54) METHOD AND APPARATUS FOR DETERMINING THE FAILING OPERATION OF A DEVICE-UNDER-TEST

(75) Inventors: Pedro Martin-de-Nicolas, Austin, TX (US); Charles Leverett Meissner, Austin, TX (US); Michael Timothy Saunders, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/138,894

(22) Filed: May 2, 2002

(65) Prior Publication Data
US 2003/0208710 A1     Nov. 6, 2003

(51) Int. Cl.
 *G01R 31/28* (2006.01)
(52) U.S. Cl. ..................................... 714/736
(58) Field of Classification Search ............ 714/38, 714/724, 726, 736, 727, 733–735; 324/765, 324/158.1
See application file for complete search history.

(56) References Cited

U.S. PATENT DOCUMENTS 4,194,113 A  *  3/1980  Fulks et al. ................. 714/732
4,687,988 A  *  8/1987  Eichelberger et al. ..... 324/73.1
4,801,870 A  *  1/1989  Eichelberger et al. ...... 714/736
5,391,985 A  *  2/1995  Henley .................... 324/158.1
5,570,011 A  *  10/1996  Henley .................... 324/158.1
6,128,757 A  *  10/2000  Yousuf et al. ............... 714/724
6,260,166 B1 *  7/2001  Bhavsar et al. ............. 714/727
6,452,411 B1 *  9/2002  Miller et al. ................. 324/765
6,499,121 B1 *  12/2002  Roy et al. .................... 714/724
6,760,873 B1 *  7/2004  Hao et al. .................... 714/724

FOREIGN PATENT DOCUMENTS

JP          405157806 A  *  6/1993
JP          406317631 A  *  11/1994

OTHER PUBLICATIONS

"Supplying Known Good Die for MCM Applications Using Low Cost Embedded Testing" by Frisch et al. in International Test Conference Proceedings Publication Date: Oct. 21-25, 1995 pp. 328-335 Inspec Accession No. 5254158.*

(Continued)

*Primary Examiner*—Guy Lamarre
*Assistant Examiner*—Cynthia Britt
(74) *Attorney, Agent, or Firm*—Carr LLP; Diana R. Gerhardt

(57) ABSTRACT

The present invention provides an apparatus and a method for testing one or more electrical components. The apparatus and method execute similar portions of a test segment on a known device, i.e., a device for which it has been determined that the test segment executes successfully, and on a device-under-test (DUT), i.e., a device for which it has been determined that the test segment does not execute successfully. The results of the tests are compared to determine if the test passed or failed. The test segment is executed iteratively on the known device and the DUT, increasing or decreasing the amount of the test segment that is executed each pass until the failing instruction is identified.

19 Claims, 3 Drawing Sheets

OTHER PUBLICATIONS

"Directed-Binary Search in Logic BIST Diagnostics" by Kapur et al. Design, Automation and Test in Europe Conference and Exhibition, 2002 Publication Date: Mar. 4-8, 2002 p. 1121 ISSN: 1530-1591 INSPEC Accession No. 7348478.*

"Structured Computer Organization" second edition by Andrew Tanenbaum 1984 Prentice-Hall Inc.*

"3 value trace based fault simulation of synchronous sequential circuits" Song et al. in IEEE Transactions of Computer Aided Design of Integrated Circuits and Systems vol. 12 issue 9 Sep. 1993.*

"Acceleration of Trace based Fault simulation of combinational circuits circuits" Song et al. in IEEE Transactions of Computer Aided Design of Integrated Circuits and Systems vol. 12 issue 9 Sep. 1993.*

"Parallel Pattern Fault Simulation based onStem Faults in Combinational Circuits" Song et al. 1990 International Test conference proceedings Sep. 10-14, 1990 pp. 706-711.*

* cited by examiner

METHOD AND APPARATUS FOR DETERMINING THE FAILING OPERATION OF A DEVICE-UNDER-TEST

BACKGROUND OF THE INVENTION

1. Field of the Invention

The invention relates generally to testing systems for electronic components and, more particularly, to a method and an apparatus for determining the failing operation of a device-under-test (DUT).

2. Description of Related Art

Testing of hardware and software generally involves executing a set of instructions and/or commands and comparing the actual results with the expected results. If the actual results match the expected results, the test case was successful. If the actual results do not match the expected results, then the test case failed.

Generally, determining where in the failed test case that the failure actually occurred, i.e., the failed instruction, is a manual process. One technique of determining the failed instruction utilizes a pattern generator to reconfigure the DUT to a repeatable starting state, allowing for a repeatable instruction stream. This technique, however, is limited to the number of instructions generated by the pattern generator.

Another technique, commonly utilized in situations where the instructions comprise a set of uncontrollable source code, such as an operating system boot sequence, is to configure a host computer to halt the DUT at various cycles. The state of the DUT is evaluated and compared to the state of a known, good device in a similar state.

These techniques, however, are generally time consuming and complicated. The results and or the state of the DUT is not always readily available or apparent and may require additional analysis.

Therefore, there is a need to provide a method and an apparatus to automatically test a DUT and to identify the failing instruction.

SUMMARY

The present invention provides an apparatus and a method for testing one or more electrical components. The apparatus and method performs a test segment for N cycles on a known device that performs the test segment successfully and a device-under-test (DUT) that performs the test segment unsuccessfully. The expected results, i.e., the results of the known device, are compared to the actual results, i.e., the results of the DUT. The value of N is increased if the expected results match the actual results, and the value of N is decreased if the expected results do not match the actual results. The testing and the adjustment of N is performed iteratively until the failing instruction is identified.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
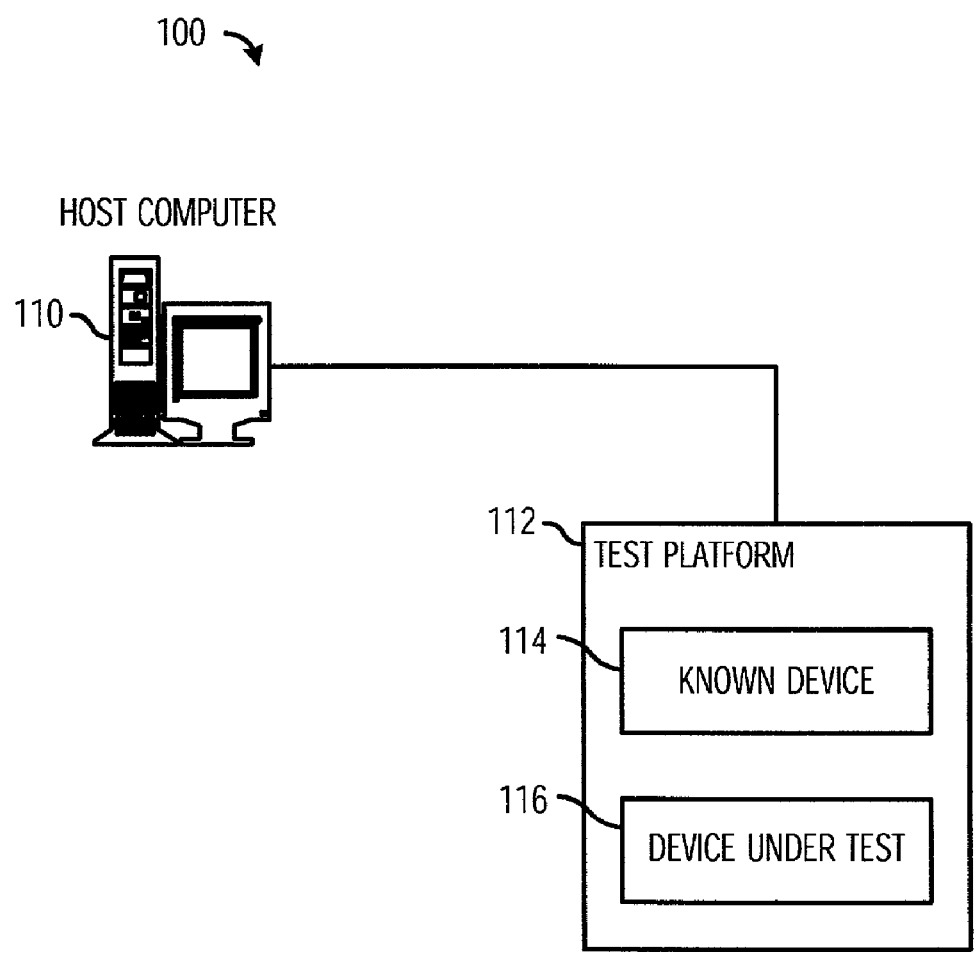
FIG. 1 is a schematic diagram of a typical testing environment that embodies the present invention.

Referring to FIG. 1 of the drawings, the reference numeral 100 generally designates a test system embodying features of the present invention. The test system 100 generally comprises a host computer 110, such as a Workstation Model 270 manufactured by IBM Corporation, connected to a test platform 112. The test platform 112 preferably comprises a known device 114 and a DUT 116. The DUT 116 is a device, such as a microprocessor, or the like, that has been identified as failing one or more tests. The known device 114 is generally a device similar to the DUT 116 that has been identified as passing all relevant tests, and will be used to compare the results of the DUT 116 to aid in identifying the failing instruction. Preferably, the test platform 112 is capable of receiving the known device 114 and the DUT 116 simultaneously to allow fully automated test procedures to be performed, as is discussed in greater detail below.

In an alternative embodiment, however, the test platform 112 receives the known device 114 and the DUT 116 separately. In this alternative embodiment, the known device 114 and the DUT 116 are switched during the testing of the devices. The method and system of switching the known device 114 and the DUT 116 during the testing of the devices is considered known to a person of ordinary skill in the art upon a reading of the present disclosure.

The host computer 110, via a debug controller (not shown) operating on the host computer 110, is configured to control the operation of the known device 114 and the DUT 116 by providing instruction sets, start/stop locations, and the like. Additionally, the host computer 110 is configured to provide test case information to the test platform 112 and to receive test case results from the test platform 112. Other components, such as memories, a bus arbiter, I/O chipset, debug connectors, and the like, which may be necessary for the operation of the present invention, are considered well known to a person of ordinary skill in the art, and, therefore, are neither shown nor discussed in greater detail. A preferred embodiment of the test platform 112 is more particularly described in copending and coassigned U.S. patent application Ser. No. 09/998,390, entitled "Method and System for Testing Electronic Components", which is incorporated by reference herein for all purposes.

In operation, the host computer 110 loads test case information, such as a test segment comprising one or more instructions, memory, register values, and/or the like, onto the test platform 112, preferably into one or more memories (not shown). As discussed in greater detail below with reference to FIG. 2, the host computer 110 instructs the known device 114 and the DUT 116 to perform the test case. The results of the known device 114, i.e., the expected results, are compared with the results of the DUT 116, i.e., the actual results. The test segment is adjusted accordingly and the test re-executed until the failing instruction is identified.

Figure 2:
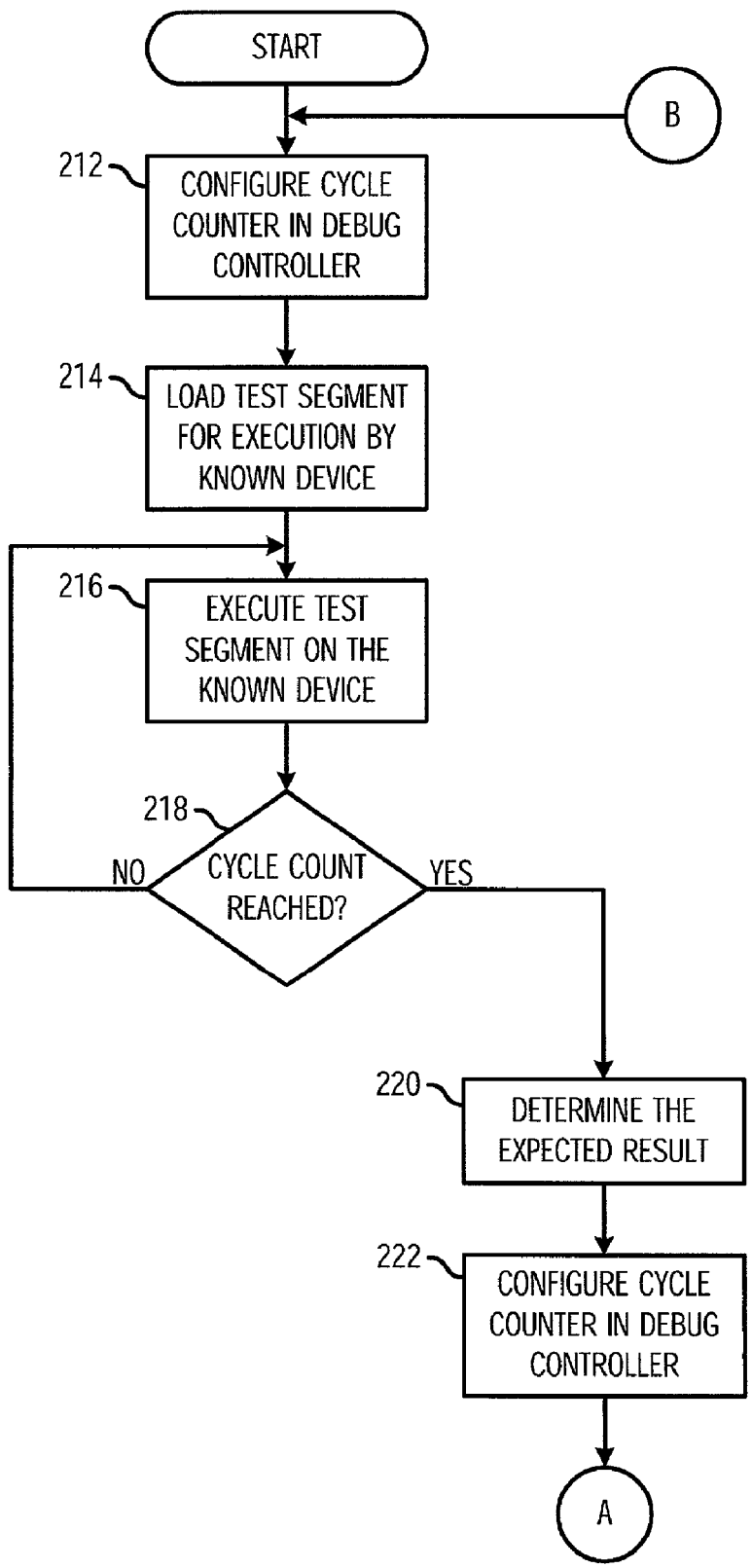
FIG. 2 is a data flow diagram illustrating one embodiment of the present invention in which the failing instruction of a DUT is automatically identified.
Figure 2:
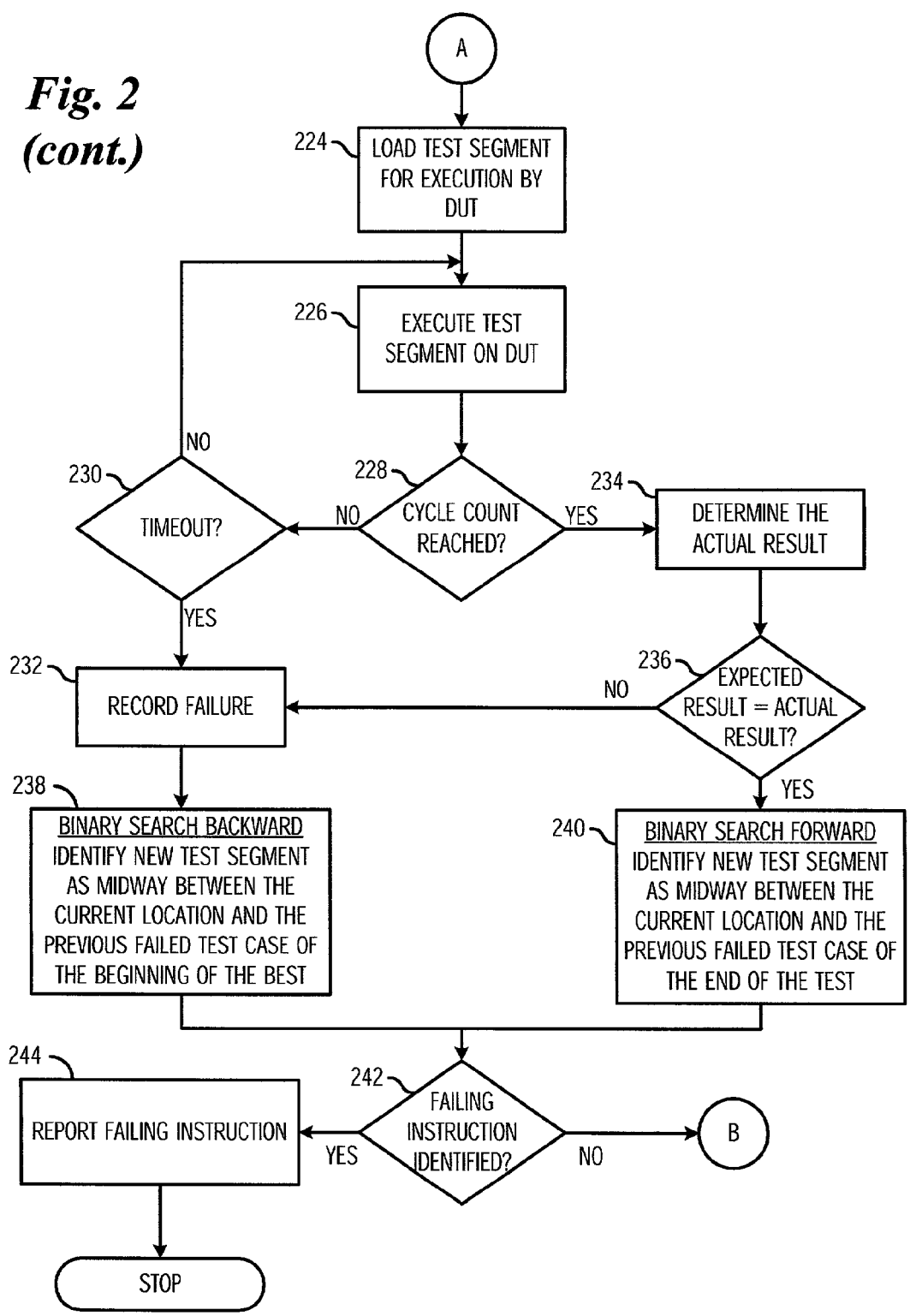

FIG. 2 is a flow chart depicting steps that may be performed by the test system 100 in accordance with one embodiment of the present invention that determines the failing instruction of the DUT 116. Processing begins in step 212, wherein the debug controller configures a cycle counter that indicates the portion of the test segment that is to be performed by the known device 114. Preferably, the test segment is a section of instructions or code that has been identified as failing one or more tests. The cycle counter represents the number of instructions, clock cycles, and/or the like, that the device, i.e., the known device 114 and/or the DUT 116, is to perform.

In step 214, the debug controller loads the test segment onto the test platform 112. Loading the test segment onto the test platform may require the initialization of memories, registers, ports, interrupt lines, and/or the like. The loading of the test segment onto the test platform is considered known to a person of ordinary skill in the art upon a reading of the present disclosure.

In step 216, the known device 114 begins performing the test segment. As discussed above, a cycle counter is configured to control the amount of the test segment that is to be performed. Accordingly, in step 218, a determination is made whether the cycle counter has been reached. If, in step 218, a determination is made that the cycle counter has not been reached, then processing returns to step 216, wherein the known device 114 continues performing the test segment.

If, however, in step 218, a determination is made that the cycle counter has been reached, then processing proceeds to step 220, wherein an expected result is determined. Preferably, the expected result comprises a Cyclic Redundancy Checker (CRC) value as described in the copending and coassigned U.S. patent application Ser. No. 09/998,399, entitled "Method and Apparatus for Test Case Evaluation Using a Cyclic Redundancy Checker", which is incorporated by reference herein for all purposes. Briefly, a CRC value is determined by performing a CRC algorithm over a section of memory. Disparities between the operation of multiple devices may be easily found by performing a similar test on each device, calculating the CRC value over a similar section of memory of each device, and comparing the CRC values. Alternatively, other values or algorithms may be used to determine the expected result. For example, the expected result may comprise of one or more sections of memory, the values of one or more scan chains, and/or the like.

In step 222, the debug controller configures a cycle counter that indicates the portion of the test segment that is to be performed by the DUT 116. The cycle counter is preferably set in a manner as described above, with reference to step 212, for the known device 114.

In step 224, the debug controller loads the test segment onto the test platform 112 in preparation of being executed by the DUT 116. In step 226, the DUT 116 begins performing the test segment. As discussed above, the cycle counter is configured to control the amount of the test segment that is to be performed. Accordingly, in step 228, a determination is made whether the cycle counter has been reached. If, in step 228, a determination is made that the cycle counter has not been reached, then processing proceeds to step 230. In step 230, a determination is made whether the DUT 116 has timed out.

Preferably, the DUT 116 is allowed a predetermined amount of time, i.e., the timeout value, to perform the test segment, after which time it will be deemed that the DUT 116 has failed the test. The predetermined amount of time is preferably set such that the DUT 116 has sufficient amount of time to execute the test segment plus an additional amount of time to allow for irregularities in the timing and operation of the DUT 116. For example, the predetermined amount of time for the timeout value may be set to the time the known device 114 requires to execute the equivalent test segment plus an additional amount, such as 10%–500%. Alternatively, the timeout value may be set to a static value and/or the like.

If, in step 230, a determination is made that the DUT 116 has not timed out, then processing returns to step 226, wherein execution of the test segment continues on the DUT 116.

If, in step 228, a determination is made that the cycle counter has been reached, i.e., the DUT 116 has executed the section of the test segment identified by the cycle counter, then processing proceeds to step 234, wherein an actual result is determined. The actual result is preferably determined similarly to the expected result, as described above with reference to step 220, over an equivalent section of memory. In step 234, a determination is made whether the expected result determined from the execution of the test segment by the known device 114 in step 220 is substantially equivalent to the actual result determined from the execution of the test segment by the DUT 116 in step 234.

If, in step 236, a determination is made that the expected result is not substantially equivalent to the actual result, or, in step 230, a determination is made that the DUT 116 has timed out, then processing proceeds to step 232, wherein a failure is recorded. As a result of recording a failure, processing proceeds to step 238, wherein a binary-search-backward function is performed.

Generally, if the DUT 116 fails a test, then the error occurred prior to the completion of the test segment. Therefore, it is desirable to reduce the number of instructions that are to be executed in the test segment in an attempt to identify the failing instruction. In the preferred embodiment, a binary search algorithm is utilized to quickly identify the failing instruction by increasing and/or decreasing the number of instructions to be executed in the test segment until the failing instruction may be identified.

Accordingly, in step 238, a new test segment is identified to be tested by decreasing the cycle counter. Preferably the new test segment is identified by modifying the cycle counter to be substantially equivalent to the value midway between the current cycle counter and the cycle counter value for the previously successful test, or midway between the current cycle counter and the beginning of the test.

Furthermore, in step 240, if a determination is made in step 236 that the expected result is equivalent to the actual result, a binary-search-forward function is performed. Preferably, the cycle counter is modified to be substantially equivalent to the value midway between the current cycle counter and the cycle counter value for the previously failed test, or midway between the current cycle counter and the end of the test.

In step 242, a determination is made whether, as a result of the binary-search-backward function and/or the binary-search-forward function, the failing instruction has been identified. As one skilled in the art will appreciate, performing the above-described process in an iterative manner will effectively identify the failing instruction.

Accordingly, if, in step 242, a determination is made that the failing instruction has been identified, then processing proceeds to step 244, wherein the failing instruction is reported to the user. If, however, in step 242, the failing instruction has not been identified, then processing returns to step 212, wherein the testing process described above is repeated with a new cycle counter identifying the new test segment.

It should be noted that the foregoing disclosure discusses the invention in terms of the preferred embodiment in which the host computer is an external host computer configured to control the execution of test cases and the like. The invention, however, is equally applicable to the situation in which the host computer is integrated into the test platform. The use of the present invention in such an environment is considered to be within the skills of a person of ordinary skill in the art upon a reading of the present disclosure.

It is understood that the present invention can take many forms and embodiments. Accordingly, several variations may be made in the foregoing without departing from the spirit or the scope of the invention. For example, other algorithms besides a binary search algorithm may be used to identify the failing instruction, other algorithms besides the CRC algorithm may be used to determine the expected and actual results, and the like. It is also understood that the expected value can be determined by simulation runs or by manual calculation. Both of these techniques imply the use of additional tools and resources available to those skilled in the art to predict the normal state of the DUT at any given cycle during the execution of a known instruction set.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of identifying a cycle with a failing instruction, the method comprising the steps of:
    executing on a known device a test segment having N cycles, each of which cycle has one or more instructions, generating a first result;
    executing on a device-under-test (DUT) the test segment having N cycles, generating a second result;
    determining whether the first result is substantially equivalent to the second result;
    upon a determination that the first result is substantially equivalent to the second result, increasing N;
    upon a determination that the first result is not substantially equivalent to the second result, decreasing N;
    determining whether the test segment identifies the cycle with the failing instruction;
    upon a determination that the test segment does not identify the cycle with the failing instruction, repeating the steps above, including executing the test segment on the known device; and
    upon a determination that the test segment does identify the cycle with the failing instruction, reporting the failing instruction.

2. The method of claim 1, wherein the steps of increasing N and decreasing N are performed in accordance with a binary-search algorithm.

3. The method of claim 1, wherein the second result and the first result are a cyclic-redundancy-checker value, a value of one or more sections of memory, or a value from a scan chain.

4. The method of claim 1, wherein N cycles represents a number of clock cycles or a number of instructions corresponding to the test segment.

5. The method of claim 1, wherein the known device and the DUT is a Central Processing Unit (CPU).

6. The method of claim 1, wherein the test segment is boot sequences of a Central Processing Unit (CPU).

7. An apparatus for identifying a cycle with a failing instruction, the apparatus comprising:
    means for executing on a known device a test segment having N cycles, each of which cycle has one or more instructions, generating a first result;
    means for executing on a device-under-test (DUT) the test segment having N cycles, generating a second result;
    means for determining whether the first result is substantially equivalent to the second result;
    means for increasing N upon a determination that the first result is substantially equivalent to the second result;
    means for decreasing N upon a determination that the first result is not substantially equivalent to the second result;
    means for determining whether the test segment identifies the cycle with the failing instruction;
    means for repeating the steps necessary to identify the failing instruction, including executing the test segment on the known device, upon a determination that the test segment does not identify the cycle with the failing instruction; and
    means for reporting the failing instruction upon a determination that the test segment does identify the cycle with the failing instruction.

8. The apparatus of claim 7, wherein the means for increasing N and the means for decreasing N operate in accordance with a binary-search algorithm.

9. The apparatus of claim 7, wherein the second result and the first result are a cyclic-redundancy-checker value, a value of one or more sections of memory, or a value from a scan chain.

10. The apparatus of claim 7, wherein N cycles represents a number of clock cycles or a number of instructions corresponding to the test segment.

11. The apparatus of claim 7, wherein the known device and the DUT is a Central Processing Unit (CPU).

12. The apparatus of claim 7, wherein the test segment is boot sequences of a Central Processing Unit (CPU).

13. A computer program product for identifying a cycle with a failing instruction, the computer program product having a medium with a computer program embodied thereon, the computer program comprising:
    computer program code for executing on a known device a test segment having N cycles, each of which cycle has one or more instructions, generating a first result;
    computer program code for executing on a device-under-test (DUT) the test segment having N cycles, generating a second result;
    computer program code for determining whether the first result is substantially equivalent to the second result;
    computer program code for increasing N upon a determination that the first result is substantially equivalent to the second result;

computer program code for decreasing N upon a determination that the first result is not substantially equivalent to the second result;

computer program code for determining whether the test segment identifies the cycle with the failing instruction;

computer program code for repeating the steps necessary to identify the failing instruction; including executing the test segment on the known device, upon a determination that the test segment does not identify the cycle with the failing instruction; and computer program code for reporting the failing instruction upon a determination that the test segment does identify the cycle with the failing instruction.

14. The computer program product of claim 13, wherein the computer program code for increasing N and the computer program code for decreasing N have a binary-search algorithm.

15. The computer program product of claim 13, wherein the second result and the first result are a cyclic-redundancy-checker value, a value of one or more sections of memory, or a value from a scan chain.

16. The computer program product of claim 13, wherein N cycles represents a number of clock cycles or a number of instructions corresponding to the test segment.

17. The computer program product of claim 13, wherein the known device and the DUT is a Central Processing Unit (CPU).

18. The computer program product of claim 13, wherein the test segment is boot sequences of a Central Processing Unit (CPU).

19. A method of identifying a cycle with a failing instruction within a computer, the method comprising the steps of:

executing on a known device a test segment having N cycles, each of which cycle has one or more instructions, generating a first result;

executing on a device-under-test (DUT) the test segment having N cycles, generating a second result;

determining whether the first result is substantially equivalent to the second result;

upon a determination that the first result is substantially equivalent to the second result, increasing N by using a binary search forward algorithm;

upon a determination that the first result is not substantially equivalent to the second result, decreasing N by using a binary search backward algorithm;

determining whether the test segment identifies the cycle with the failing instruction;

upon a determination that the test segment does not identify the cycle with the failing instruction, repeating the steps above, including executing the test segment on the known device; and upon a determination that the test segment does identify the cycle with the failing instruction, reporting the failing instruction.

* * * * *